United States Patent [19]

Pike

[11] Patent Number: 4,678,820

[45] Date of Patent: Jul. 7, 1987

[54] AMORPHOUS HYDRATED METAL OXIDE PRIMER FOR COMPOSITE FIBERS

[75] Inventor: Roscoe A. Pike, Granby, Conn.

[73] Assignee: United Technologies Corporation, Hartford, Conn.

[21] Appl. No.: 774,257

[22] Filed: Sep. 9, 1985

[51] Int. Cl.$^4$ ............................. C08K 7/04; C08K 3/04
[52] U.S. Cl. ..................................... 523/200; 523/204; 264/136; 428/378
[58] Field of Search ................ 523/200, 204; 428/378; 264/136, 137

[56] References Cited

U.S. PATENT DOCUMENTS

| | | | |
|---|---|---|---|
| 3,440,181 | 4/1969 | Olstowski | 523/200 |
| 3,821,013 | 6/1974 | Daley et al. | 428/378 |
| 4,379,111 | 4/1983 | Smith et al. | 264/137 |
| 4,402,779 | 9/1983 | Levy | 264/136 |

FOREIGN PATENT DOCUMENTS 59-115343  7/1984  Japan .................... 523/200

*Primary Examiner*—Lewis T. Jacobs
*Attorney, Agent, or Firm*—A. Dean Olson

[57] ABSTRACT

An amorphous hydrated metal oxide primer for fibers incorporated into fiber reinforced polymeric matrix composites result in composites having wet strength retention. The layer of amorphous hydrated metal oxide is formed by depositing on the fiber and subsequent hydrolysis of a layer of $M_xOR_y$ where x is 1, y is 3 or 4, M is any metal capable of forming a stable alkoxide and R is an organic radical. Fiber reinforced polymeric matrix composites are preferably made by applying a layer of $M_xOR_y$ to the fiber where x is 1, y is 3 or 4, M is any metal capable of forming a stable alkoxide and R is an organic radical. The fiber having a layer of metal alkoxide is exposed to moisture and a temperature of about 25° C. to about 125° C., impregnated with a resin and stacked in a mold. The stacked impregnated fibers are then pressed with optional heat resulting in a composite having wet strength retention.

6 Claims, No Drawings

AMORPHOUS HYDRATED METAL OXIDE PRIMER FOR COMPOSITE FIBERS

CROSS REFERENCE TO RELATED APPLICATION

Attention is directed to commonly assigned copending application Ser. No. 774,296, entitled "Amorphous Hydrated Metal Oxide Primer for Organic Adhesively Bonded Joints", filed on even date herewith, which discloses material similar to that used in the present application, the disclosure of which is hereby incorporated by reference.

DESCRIPTION

1. Technical Field

The field of art to which this invention pertains is composites and methods for making composites.

2. Background Art

Weight saving and manufacturing cost benefits have led to the increase in use of organic matrix fiber reinforced composite structures in the aircraft and aerospace industries. In order to be a viable alternative to metal these composites should maintain the strength typical of conventional structural systems. In many applications composites are put under a variety of environmental and mechanical stresses. For example, frequently these composites are exposed over long periods of time to wet environments which can result in a loss of strength. The loss of strength can result from the extension of cracks and other deformations that occur and which are exacerbated by the moist environment. As a result of this deficiency, extensive research and development efforts have been undertaken to define methods and identify materials which improve composite performance in humid conditions (e.g. wet strength retention). For example, it is known that surface preparation of fibers can be important in the formation of composites. Thus, the fiber can be chemically pretreated with an organic primer or sizing agent to produce a surface which combines with the resin to develop the strengths which meet application requirements. A variety of primers have been used to produce improved bondability including epoxy, polyimide and polyvinylacetate polymers. Although the above surface preparations have provided advantages, there is a need for new technology to aid in the advancement of lightweight aerospace-type composite structures.

Accordingly, there is a constant search in this field of art for new methods of providing lightweight, structurally sound composites.

DISCLOSURE OF INVENTION

This disclosure is directed to composites having wet strength retention. A fiber reinforced polymeric matrix composite utilizes as the fiber reinforcement fibers having a layer of amorphous hydrated metal oxide. The amorphous hydrated metal oxide is formed by deposition on the fiber and subsequent hydrolysis of a layer of $M_x OR_y$. In the formula $M_x OR_y$, x is 1, y is 3 or 4, M is any metal capable of forming a stable alkoxide and R is an organic radical.

Another aspect of this invention is a method for making composite articles having wet strength retention. A fiber reinforced polymeric matrix composite material is made by applying a layer of $M_x OR_y$ to the fibers. In $M_x OR_y$, x is 1, y is 3 or 4, M is any metal capable of forming a stable alkoxide and R is an organic radical.

The fibers having a layer of metal alkoxide are then exposed to moisture and a temperature of about 25° C. to about 125° C., impregnated with a resin, and stacked in a mold. The stacked impregnated fibers are pressed with optional heat.

This amorphous hydrated metal oxide primer for composite fibers provides composites that retain wet strength. Thus, this invention makes a significant advance to the aerospace industry by providing new technology relating to structural composites.

Other features and advantages will be apparent from the specification and claims.

BEST MODE FOR CARRYING OUT THE INVENTION

Any metal alkoxide that hydrolizes to give an amorphous hydrated metal oxide (i.e. a monohydroxy metal oxide) may be used in the practice of this invention. Metal alkoxides having the formula $M_x(OR)_y$ where x is 1 and y is 3 or 4 are preferred in forming the metal oxide primer of this disclosure, y being determined by the particular valence of the metal. y should not be 2 as typically a valence of at least 3 is necessary to form a monohydroxy metal oxide. M is any metal capable of forming a stable alkoxide, which can be purified by, for example, distillation or crystallization without decomposition; as y is defined above essentially all metals meet this requirement. It is preferred that the metal is selected from the group consisting of titanium, zirconium, silicon, nickel, iron and aluminum. Typically, R can be any organic radical that can be distilled at temperatures below about 300° C. Since the alkoxide (—OR moiety) is not incorporated into the primer, the important criteria associated with it is that the resultant alcohol can be volatilized at temperatures that are not high enough to damage the primer or substrate. It is preferred that R is an alkane radical from $C_1$ to $C_{10}$. It is especially preferred that R is methyl, ethyl, propyl or sec-butyl as these radicals are volatilized as alcohols at relatively low temperatures. In addition, the alkoxides can be modified by incorporation of varying amounts of additives such as phosphate, chromate or magnesium oxide without affecting the primer properties. Mixtures of the above metal alkoxides may also be used in the practice of this invention.

The above metal alkoxides hydrolize to amorphous hydrated metal oxides (primer) when exposed to moisture such as atmospheric moisture or moisture on the metal substrate surface and optionally heat as described below. An exemplary reaction believed to occur is that of aluminum alkoxide to alumina. The initial hydrolysation reaction of aluminum alkoxides is empirically illustrated as

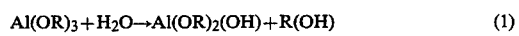

$$Al(OR)_3 + H_2O \rightarrow Al(OR)_2(OH) + R(OH) \quad (1)$$

This reaction proceeds rapidly with further hydrolysation-polymerisation to

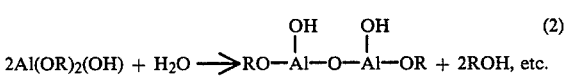

to incorporate n aluminum ions, i.e. $Al_n O_{n-1}(OH)_{(n+2)-x}(OR)_x$ assuming linear polymerisation for simplicity. As the reaction proceeds the number of OR groups, i.e. x, relative to n decreases to a value depending on the hydrolysis temperature and available moisture concentration. Under normal application conditions, the ratio of residual OR groups as designated by x is less than 4 and n is 28 or greater. Such low levels of —OR do not impede the performance of the primer. In contrast, zirconium alkoxide is believed to hydrolize to a hydrated oxide, i.e. $ZrO_2$ 1.7 $H_2O$ having no residual —OR or —OH groups.

The thickness of this primer layer can vary effectively from about 0.15 microns ($\mu$) to about 10$\mu$. Preferably the thickness is about 0.3$\mu$ to about 1.0$\mu$. Above about 10$\mu$, the layer can be so thick as to create stress risers and to form a weak boundary layer. Below about 0.15$\mu$, the layer does not provide the properties such as crack propagation resistance at the levels typically required. In addition, it is preferable to apply the primer to the fiber surface with a plurality of layers of metal alkoxide as this facilitates removal of volatiles and solvent which can be more difficult to achieve from a single thick application.

Any fiber may be used in the practice of this invention that is useful for making composite articles. Examples include amide, carbon, metal, glass, silicon carbide and Kevlar TM fibers (DuPont DeNemours, E.I., Co., Wilmington, Del.). Preferably graphite or glass fibers are used as these provide the properties most desired of composites such as strength and light weight. It is especially preferred to use graphile available from Celanese or Union Carbide as it resists environmental stresses and produces lightweight composites having good strength.

Any conventional resin matrix can be used for the practice of this invention that is useful for making composite articles. Preferably epoxides or polyimide resins are used as these provide the properties most desired such as good strength. It is especially preferred to use 3501-6 TM resin available from Hercules, Inc. (Wilmington, Del.) or 5208 resin available from Narmco as they resist environmental stresses, are strong and are commercially readily available.

Any method of making a composite may be used for the practice of this invention that provides composites having reinforcing amorphous hydrated metal oxide coated fibers. For example, a chopped fiber composite can be made by mixing chopped fibers coated with amorphous hydrated metal oxide and resin in a mold under pressure and optional heat. However, it is preferred to apply a coating of metal alkoxide to the carbon fibers by drawing the fiber through a solution of metal alkoxide. The metal alkoxide coated composite fibers are then maintained at a temperature of about 25° C. to about 300° C. as below 25° C. the reaction kinetics are typically too slow and above 300° C. loss of desirable fiber properties or crystallization may occur with an accompanying loss of mechanical strength. It is especially preferred to heat the aluminum alkoxide coated fibers to a temperature of about 25° C. to about 125° C. as the lower temperatures minimize the risk of mechanical property degradation of fibers. Surprisingly, an increase in temperature from room temperature (R.T.) to about 325° C. does not affect an increase in metal alkoxide conversion to amorphous hydrated metal oxide.

Once coated with amorphous hydrated metal oxide, the reinforcing carbon fibers (tows) are dipped into the resin solution to form a tape prior to the molding step. Typically, the resin impregnated fibers are allowed to dry so that any solvent will evaporate. The graphite tape can then be cut into plies (layers of impregnated fibers) of the desired dimensions of the article to be fabricated. The plies are then stacked to create the desired thickness typically in metal molds coated with mold release agent such as Micro Spray TM (Micro-Spray Products Inc.). The assembled ply layup is then placed in a press and exposed to pressures and temperatures conventional for the resin system used and application desired.

EXAMPLE 1

Inorganic primer was applied to unsized Celion 6000 graphite fiber available from Celanese, Inc. by drawing the fiber tow through a 1% toluene solution of Stauffer Chemical Company aluminum alkoxide, E-8385 and drum winding the coated tows. The resulting wound tape was heated at 325° C. in an air oven to produce the amorphous alumina coating. The coated fiber was impregnated with a methylethyl ketone solution of Hercules Inc. 3501-6 epoxy resin in sufficient quantity to produce on fabrication a composite having approximately 35–40 volume percent resin. The resulting prepreg after evaportion of the solvent was cut into 3.8 cm × 12.7 cm plys. The composite was fabricated using 9 plys by compression molding in a conventional steel mold. The following cure schedule was employed:

1. Insert mold into a press at room temperature at contact pressure.
2. Raise the laminate temperature to 135° C. at a heat rate of 1°–2° C./min (50–70 minutes).
3. Hold at 135° C. for 0.5 hours then apply 5.976 Kilograms per square centimeter ($Kgm/cm^2$ pressure. Hold at these conditions for 0.5 hours. (Release pressure once to aid in volatile removal.)
4. Raise temperature to 178° C. at a heating rate of 1.5°–2.6° C./min. at 5.976 $Kgm/cm^2$ (15–25 minutes).
5. Hold at 178° C., 120 minutes at 5.976 $Kgm/cm^2$.
6. Cool to 100° C., release pressure and remove composite from mold.
7. Post cure the composite in an air oven at 178° C. for 4 hours.

These composites were then tested and the results are detailed below.

The flexural modulus and flexural strength of wet and dry composites was measured and is detailed in Tables I and II under wet conditions. The amorphous hydrated aluminum oxide coated graphite fibers had better than a 15% improvement in flexural modulus retention at elevated wet temperatures in comparison to the control (no primer) and an increase in net flexural strength retention.

TABLE I

| | Flexural Modulus | | | |
| | Flexural Modulus, GPa | | | |
| | RT | | 82° C. | |
| Fiber Coating | Dry | Wet[a] | Dry | Wet |
| Control | 122 | 121 | 121.5 | 107.5 |
| Amorphous alumina | 134 | 134 | 127 | 125 |

[a]50 hour exposure to 93% Relative Humidity (R. H.), 121° C.

TABLE II

| | Flexural Strength | | | |
| | Flexural Strength, MPA | | | |
| | RT | | 82° C. | |
| Fiber Coating | Dry | Wet[a] | Dry | Wet |
| Control | 2150 | 1300 | 1750 | 1150 |

TABLE II-continued

| | Flexural Strength Flexural Strength, MPA | | | |
|---|---|---|---|---|
| | RT | | 82° C. | |
| Fiber Coating | Dry | Wet[a] | Dry | Wet |
| Amorphous alumina | 2140 | 1700 | 1920 | 1325 |

[a] 50 hour exposure to 93% R. H., 121° C.

This primer may be used to advantage in a wide range of composites. For example, chopped fiber, filament wound and ordered fiber composites benefit from this primer. While this invention has been described in terms of a metal alkoxide, a mixture of various metal alkoxides can be used.

This primer coating provides improved strength retention in moist environments. The resulting properties such as tensile and flexural strengths of composites made with the inorganic fiber primer are at least equivalent in the dry condition to composites made using conventional organic fiber primers. Yet the inorganic primers can be utilized at thinner layers than the 5 to 10 layers typical of organic primers. Thicker layers tend to set up stress risers and to form a weak boundary layer as the components segregate. Also, because of its thermal stability the inorganic primer can be used equally as well with high temperature resins such as polyimides or with low temperature resins such as epoxy systems unlike organic sizing agents which are typically temperature specific.

This invention provides an amorphous hydrated metal oxide primer for fiber reinforced composites resulting in improved wet strength retention. Thus, it makes a significant advance in the aerospace industry by providing new technology relating to composites.

It should be understood that the invention is not limited to the particular embodiments shown and described herein, but that various changes and modifications may be made without departing from the spirit and scope of this novel concept as defined by the following claims.

I claim:

1. A fiber reinforced polymeric matrix composite material wherein the improvement comprises:
   (a) utilizing as the fiber reinforcement fibers having a layer thereon the layer of amorphous hydrated metal oxide formed by deposition onto the fiber and subsequent hydrolysis of a layer of $M_xOR_y$ where
      (i) x is 1;
      (ii) y is 3 or 4;
      (iii) M is any metal capable of forming a stable alkoxide; and
      (iv) R is an organic radical;
   resulting in a composite having wet strength retention.

2. The composite as recited in claim 1 wherein the fiber is graphite.

3. The composite as recited in claim 1 wherein M is selected from the group consisting of nickel, iron, titanium, aluminum, zirconium and silicon.

4. A method for making a fiber reinforced polymeric matrix composite material by impregnating the fibers with a resin, stacking layers of the resin impregnated fibers in a mold, and pressing the stacked impregnated fibers with optional heat wherein the improvement comprises:
   (a) applying a layer of $M_xOR_y$ to the fiber prior to impregnation with the resin wherein:
      (i) x is 1;
      (ii) y is 3 or 4;
      (iii) M is any metal capable of forming a stable alkoxide; and
      (iv) R is an organic radical;
   (b) exposing the fiber having a layer of metal alkoxide to moisture and a temperature of about 25° C. to about 125° C. resulting in a composite having wet strength retention.

5. The composite as recited in claim 4 wherein the fiber is graphite.

6. The composite as recited in claim 4 wherein M is selected from the group consisting of nickel, iron, titanium, aluminum, zirconium and silicon.

* * * * *